(12) United States Patent
Dexter

(10) Patent No.: US 10,391,947 B2
(45) Date of Patent: Aug. 27, 2019

(54) SEMI-RIGID ROOFTOP CARGO CARRIER

(71) Applicant: Tim Dexter, Orland, CA (US)

(72) Inventor: Tim Dexter, Orland, CA (US)

(*) Notice: Subject to any disclaimer, the term of this patent is extended or adjusted under 35 U.S.C. 154(b) by 0 days.

(21) Appl. No.: 15/890,056

(22) Filed: Feb. 6, 2018

(65) Prior Publication Data
US 2019/0061633 A1 Feb. 28, 2019

Related U.S. Application Data

(60) Provisional application No. 62/605,846, filed on Aug. 31, 2017.

(51) Int. Cl.
B60R 9/045 (2006.01)
B60R 9/055 (2006.01)

(52) U.S. Cl.
CPC .............. B60R 9/045 (2013.01); B60R 9/055 (2013.01)

(58) Field of Classification Search
CPC ................................ B60R 9/045; B60R 9/055
USPC .......................................................... 224/314
See application file for complete search history.

(56) References Cited

U.S. PATENT DOCUMENTS

| | | | | |
|---|---|---|---|---|
| 2,440,821 A | * | 5/1948 | Godwin | B60R 9/055 160/DIG. 2 |
| 2,621,836 A | * | 12/1952 | McMiller | B60R 9/055 135/88.15 |
| 3,000,418 A | * | 9/1961 | Bitting | B60R 9/048 180/53.8 |
| 3,000,419 A | * | 9/1961 | Morrison | B60R 9/055 224/314 |
| 4,101,062 A | * | 7/1978 | Lazar | B60P 3/38 224/314 |
| 5,096,107 A | * | 3/1992 | VanSon | B60R 9/055 224/309 |
| 5,288,003 A | * | 2/1994 | MacDonald | B60R 9/055 224/311 |
| 9,919,658 B1 | * | 3/2018 | Walther | B60R 9/06 |
| 2006/0180622 A1 | * | 8/2006 | Dexter | B60R 9/055 224/314 |

* cited by examiner

Primary Examiner — Peter N Helvey

(74) Attorney, Agent, or Firm — Lynette Wylie; Apex Juris, Pllc.

(57) ABSTRACT

A semi-rigid rooftop cargo carrier and method employing straightfront and streamlined steps for its assembly and disassembly provided by its innovative configuration of a collapsible frame including at least two elongate side members preferably equipped with extendible push bars ("EPB") each having a first and second side arm member and EPB securing mechanism engagable for abutted lengthwise alignment whereby extending the elongate member exerts opposing pressure onto end members to simultaneously push the collapsible frame and mount the external waterproof pliable shell thereon in an assembled position and also readily disaasembled without tools or loose components into a light, compact, easy-to-store configuration.

15 Claims, 5 Drawing Sheets

SEMI-RIGID ROOFTOP CARGO CARRIER

REFERENCE TO PRIOR APPLICATION

The present invention claims priority to previously filed Provisional Application, No. 62/605,846, filed on Aug. 31, 2017, which is incorporated by reference herein.

BACKGROUND OF INVENTION

Field of the Invention

The present invention relates to a vehicle rooftop cargo carrier and in particular, a collapsible semi-rigid carrier that is readily assembled and disassembled.

A rooftop cargo carrier provides extra luggage space for a vehicle, and is normally secured to the vehicle's luggage rack via rooftop attachment hardware. Since a rooftop cargo carrier is rather large and bulky, it can be difficult to store when removed from the vehicle, particularly if space is limited in a storage area.

Conventional cargo and luggage carriers mount to particular dedicated vehicle roof-tops as well as trunks and trailers and are typically built out of heavy, rigid construction materials. Such vehicle cargo carriers are bulky, difficult to ship, and rarely designed for knock down disassembly. The few knock down designs generally have complicated assembly processes utilizing numerous of components and fasteners, many of which are loose, tools and tedious steps.

Conventional cargo carriers further require dedicated fastener mechanisms for particular rooftop fixtures and applications, often lacking adaptability to other types of surface fixtures or cargo.

Additionally, storage of conventional rigid cargo carrier system are cumbersome and entail considerable space and effort to store.

Such rigid and heavy cargo carrier systems are also burdensome and expensive to ship.

Due to such and other drawbacks and problems with prior art rooftop carrier systems, there exists a persisting need for a lightweight, versatile, durable and waterproof vehicle rooftop carrier system that is easily assembled and disassembled for efficacious shipping and compact storage when not in use.

SUMMARY OF THE INVENTION

In view of the foregoing background, an object of the present invention is to provide a semi-rigid rooftop cargo carrier and method employing straightfront and streamlined steps for its assembly and disassembly. The present rooftop cargo carrier is composed of pliable, lightweight, durable and waterproof materials adaptable and is adaptable for mounting to various vehicle rooftop fixtures and collapsible to a compact configuration for ease of storage and reducing shipping cost to customers and risk of damage during shipping.

These and other objects, advantages and features in accordance with the present invention are provided by the present cargo carrier's innovative configuration including end members and at least two elongate side members preferably equipped with extendible push bars ("EPB") each including first and second side arm members securably engagable for lengthwise, extended alignment to thereby simultaneously mount the collapsible frame into upright, open position whereby the pliable shell is tensionablly mounted about the frame to thereby readily assemble the semi-rigid cargo carrier according to the present invention.

The pliable shell of the present invention utilizes a flexible sheet material having a waterproof surface. Although numerous types of fabric sheeting providing the aforementioned properties can be used to formulate the pliable shell according to the present invention, the description of the present invention will focus on use of a vinyl coated polyester polymer, as this material is readily available on the market, low cost and readily configurable to stretch about and tension fit the underlying frame. It is understood that many substitute materials including nylon, rubberized and various flexible polypropylene or similar waterproof sheeting fabrics can also be used to provide the features of the present invention.

The pliable shell according to the present invention is sized and configured for tensionable mounting about the collapsible frame such that pivoting the at least two opposing elongate side members to engage with corresponding upper corners of the at least two end members tensionably mounts the pliable shell into taut alignment about the collapsible frame whereby the opposing tension exerted between the pliable shell and the collapsible frame maintains the semi-rigid cargo carrier in an assembled position.

The semi-rigid cargo carrier according to the present invention employs a collapsible frame at least two end members which preferably include an upper longitudinal bar and a lower longitudinal bar connected by at least two opposing cross bars to form upper corners and lower corners along a substantially planar orientation at a substantially perpendicular or slightly obtuse angle with the upper and lower longitudinal bars. According to the present invention, the at least two elongate side members have opposing ends pivotally connected to corresponding upper corners of the at least two end members, and a pliable shell sized and configured for tensionable mounting about the collapsible frame such that outwardly pivoting the front and rear ends away from at least two opposing elongate side members sets the collapsible frame into an upright position and mounts the pliable shell into taut alignment whereby the opposing force exerted between the pliable shell and the collapsible frame sets the semi-rigid cargo carrier in an assembled position. In a preferred embodiment, the at least two elongate side members are oriented at a substantially perpendicular angle with the end members so as to form a substantially rectangular configuration along an upper surface when the pliable shell is mounted and thus the semi-rigid cargo carrier is in the assembled position.

In particularly preferred embodiments, the at least two elongate side members each have a first side arm member and a second side arm member each having fastenable ends securable into abutted engagement by an EPB securing mechanism to thereby extend the first side arm member and second side arm member in linear alignment along their respective longitudinal axes such that outward thrust exerted by the at least two elongate side members against corresponding upper corners of the end members simultaneously sets the collapsible frame in the upright position and tensionably mounts the pliable shell thereupon.

In particularly preferred embodiments, the EPB securing mechanism comprises a channel portion affixed to a fastenable end of each of the first side arm members of the elongate side members configured for receiving the corresponding fastenable ends of the second side arm members of the elongate side members. Such embodiments may employ a spring button on a fastenable end of the second side arm for engaging the channel portion of the EPB securing mechanism to thereby secure the at least two elongate members in abutted engagement member so as to pivot upper corners of corresponding end members into substantially perpendicular alignment with the end members so as to position the collapsible frame in the assembled position.

In particularly preferred embodiments, the elongate side members are oriented at a substantially perpendicular angle with the end members to form a substantially rectangular configuration when the semi-rigid cargo carrier is in the assembled position and further comprising three way barrel fasteners with a hinge whereby the first and second arm members hinge inwardly to nest next to corresponding end members. Preferred embodiments of the present invention further comprise a closeable side opening that is preferably a zipper wherethrough the EPB securing mechanim is accessed for engaging a channel portion configured for receiving the corresponding fastenable ends of the second side arm member of each of the elongate side members thereby detachably fastening the fastenable ends of the first side arm member and the second side arm member into abutted engagement so as to secure the at least two elongate side members in extended linear alignment along their respective longitudinal axes and pivoting the elongate side members so as to position the collapsible frame in the assembled position.

A yet further feature of the present invention is a third elongate side member having a pivot end detachably mountable to an upper longitudinal bar between the at least two side members and a fastenable end detachably mountable to an upper longitudinal bar between the at least two side members when the semi-rigid cargo carrier is in the assembled position. The third side member has an EPB for securing the support bar in an extended aligned position when the semi-rigid cargo carrier is in assembled position.

Further provided by the present invention is a method for assembling a semi-rigid cargo carrier, comprising the steps of providing two opposing end members with an upper longitudinal bar and a lower longitudinal bar connected by at least two opposing cross bars to form upper corners and lower corners along a substantially planar orientation at a substantially perpendicular or slightly obtuse angle with the upper and lower longitudinal bars connected in perpendicular orientation to at least two opposing elongate side members comprising a first side arm member and a second side arm member having a fastenable ends for abutted engagement in an EPB securing mechanism to extend the at least two elongate side members into extended alignment and a pliable shell sized and configured for mounted tensionable seating about the collapsible frame, wherein the pliable shell has at least two closeable side openings for accessing the first and second side arm members of the at least two elongate side members. The next step of the present method for assembling the semi-rigid cargo carrier is opening the closeable side opening to acces the first bar and second bar of each of the at least two elongate side members, fastening the EPB securing mechanism to extend each of the at least two elongate side members into extended position whereby opposing outward thrust exerted against corresponding upper corners of the end members simultaneously opens the collapsibe frame into an upright position pivoting the pivot ends of the at least two opposing elongate side members to engage with corresponding upper corners of the at least two end members so as to mount the pliable shell into taut alignment whereby the opposing tension pliable shell and the collapsible frame maintains the semi-rigid cargo carrier in an assembled position; and closing the closeable side opening.

Fastening the EPB securing mechanism may further employ an EPB securing mechanism having a channel portion affixed to the fastenable end of the first side arm member of each of the elongate side members configured for receiving the corresponding fastenable ends of the second side arm member of each of the elongate side members, providing a spring button proximal to a fastenable end of the second side arm member for engaging corresponding fastenable ends of the first and second side arm members into abutted extended alignment, inserting the fastenable end of second side arm members of each of the elongate side members into the channel portion on the fastenable end of the first side arm member of each of the elongate side members, depressing spring buttons near the fastenable end of the second side arm member to clear passage of pivot end of the first side arm member for receiving the corresponding fastenable ends of the second side arm member, pushing fastenable ends of the first side arm members into each of the elongate side members each of the at least two elongate side members into extended, aligned position, and pivoting the corner fasteners so as to position the collapsible frame in the assembled position.

The method of the present invention also includes streamlined disassembly comprising the steps of: opening the closeable side opening, releasing the EPB securing mechanism to thereby disengage the first side arm members and the second side arm members of the at least two elongate side members, pivoting first and second side arm members inwardly to nest on corresponding side arm members and thereby collapse into a disassembled position; and folding the pliable shell about the collapsible frame in the disassembled position.

Components of the present collapsible frame include end members and opposing elongate side members that are pivotally secured by corner fasteners preferably equipped with a pivot mechanism such as a hinge whereby elongate side members are pivotable inwardly toward respective end members in a collapsed position and thereby readily facilitate disassembly and compact storage when not in use. In a preferred embodiment, the pivot mechanism employs equivalent pivotable commercially available fastener systems such as, for example, hinged three-way barrels or tubes configured for receiving corresponding side and top cross bars of the fastened front or end member. A particularly preferred embodiment of the present invention further employs a spring lock to secure pivot mechanisms in an open position where opposing elongate side members are juxtapositioned in substantially perpendicular orientation from opposing upper surfaces of the front and end members comprising rectangular frames or panels to form a generally rectangular top frame. In alternative embodiments, the pivot mechanism can be a flat or curved hinge or any substantially equivalent fastener or connection means to pivotally connect the elongate side members to corresponding end members.

As previously mentioned, a particularly preferred embodiment of the present invention employs first and second side arm members of the elongate side members having EPB accessible through adjacent zippered openings in the pliable shell wherein a first side bar member is inserted and engaged within a corresponding channel member of a second side bar to secure the EPB in an extended position to thereby tautly stretch the pliable pliable shell about the frame in a fitted assembled open position. In a particularly preferred embodiment the first and second side bars employ a spring button on the second side bar insertable into the end channel portion of the second side bar and provides a mechanism whereby the first side bar is cleared to slide into the channel portion of the second side bar and then provided with a corresponding concavity wherein the spring secures the spring button to lock the side member into extended locked position whereby the frame extends outwardly in taut correspondence with the shell in an assembled position. Thus, the present invention provides a rapid and facile method for assembly of the cargo carrier without tools. A yet further feature of a particularly preferred embodiment is provided by mounting at least a third elongate side member to provide support bar in parallel alignment along a substantially longitudinal axis between the two elongate side members.

The aforedescribed embodiments are adaptable to multiple applications and various sizes and configurations of vehicle rooftops and fixtures for attaching cargo carriers thereon.

DETAILED DESCRIPTION OF THE PREFERRED EMBODIMENTS

The present invention will now be described more fully hereinafter with reference to the accompanying drawings, in which preferred embodiments of the invention are shown. Now referring to FIG. 1, there is shown a perspective view of semi-rigid cargo carrier 10 with the enclosed collapsible frame 20 tautly enclosed within corresponding pliable shell 12.

Pliable shell 12 is composed of a pliable and durable, waterproof sheet material. In a preferred embodiment, pliable shell 12 is a vinyl coated polyester polymer, which is commercially available and readily configurable to stretch about and tension fit the underlying frame 20. It is understood that many substitute materials including nylon, carbon fiber and various flexible polypropylene fabrics can also be used to provide the features of the present invention.

Figure 1:
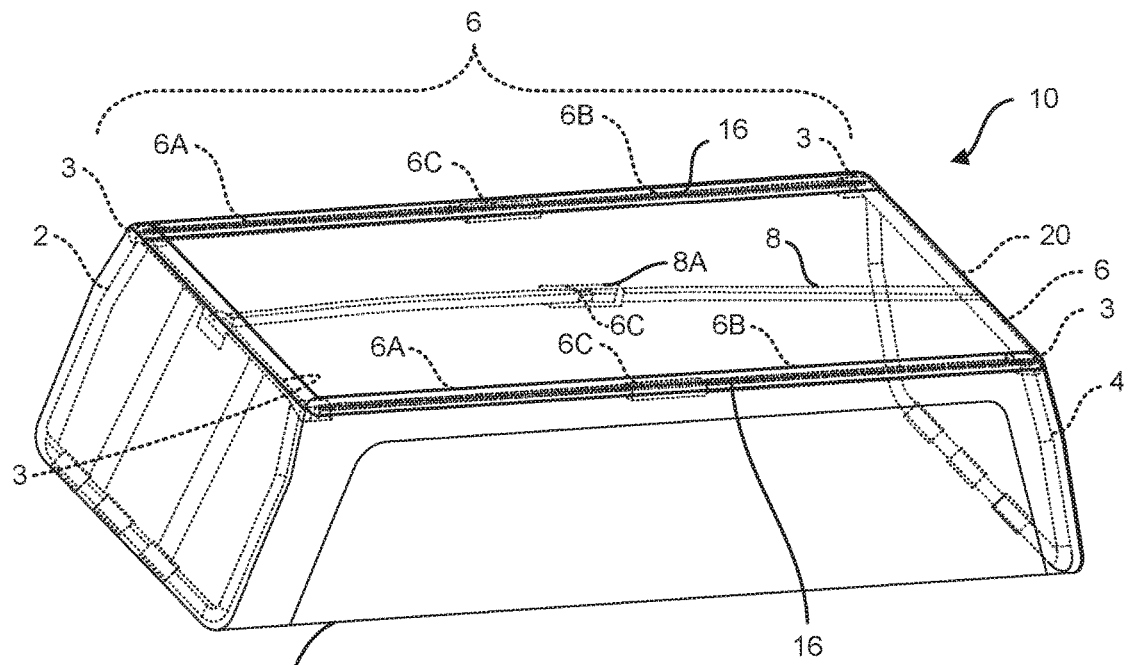
FIG. 1 is an elevated perspective view of the assembled semi-rigid rooftop cargo carrier according to the present invention.
Figure 6:
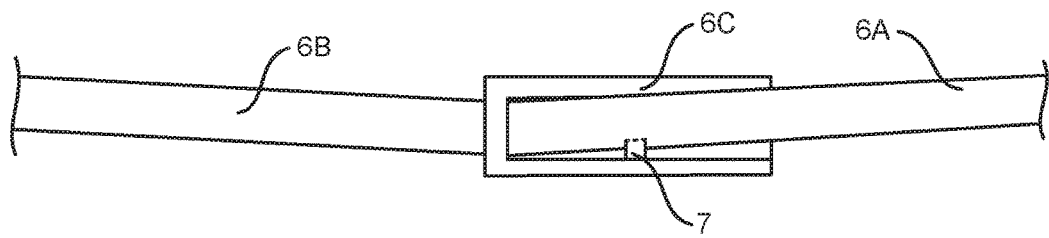
FIG. 6 is a cutaway view from the interior of cargo carrier showing how the side bars are engaged by a channel mount when a spring button is depressed in order to clear and engage the EPB channel mount to secure it into aligned extended position.

Pliable shell 12 is sized and configured for tensioned seating about collapsible frame 20 as shown in FIGS. 1 and 6. In particularly preferred embodiments, the length of the section of pliable shell 12 configured for seating along the perimeter lines formed by elongate side members 6 is about 0.5 inches (1.25 cm) shorter than the length of the perimeter line in extended position to facilitate an appropriate extent of tension when in mounted position.

Figure 2:
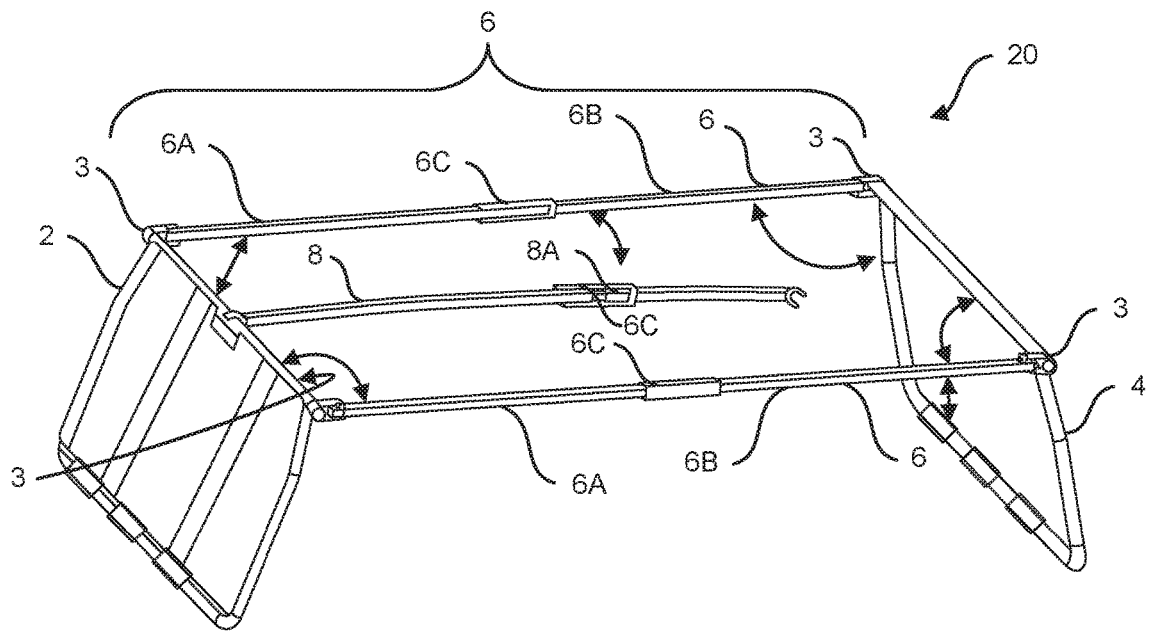
FIG. 2 is an elevated perspective view of the collapsible frame of the semi-rigid rooftop according to the present invention cargo carrier in open position.
Figure 3:
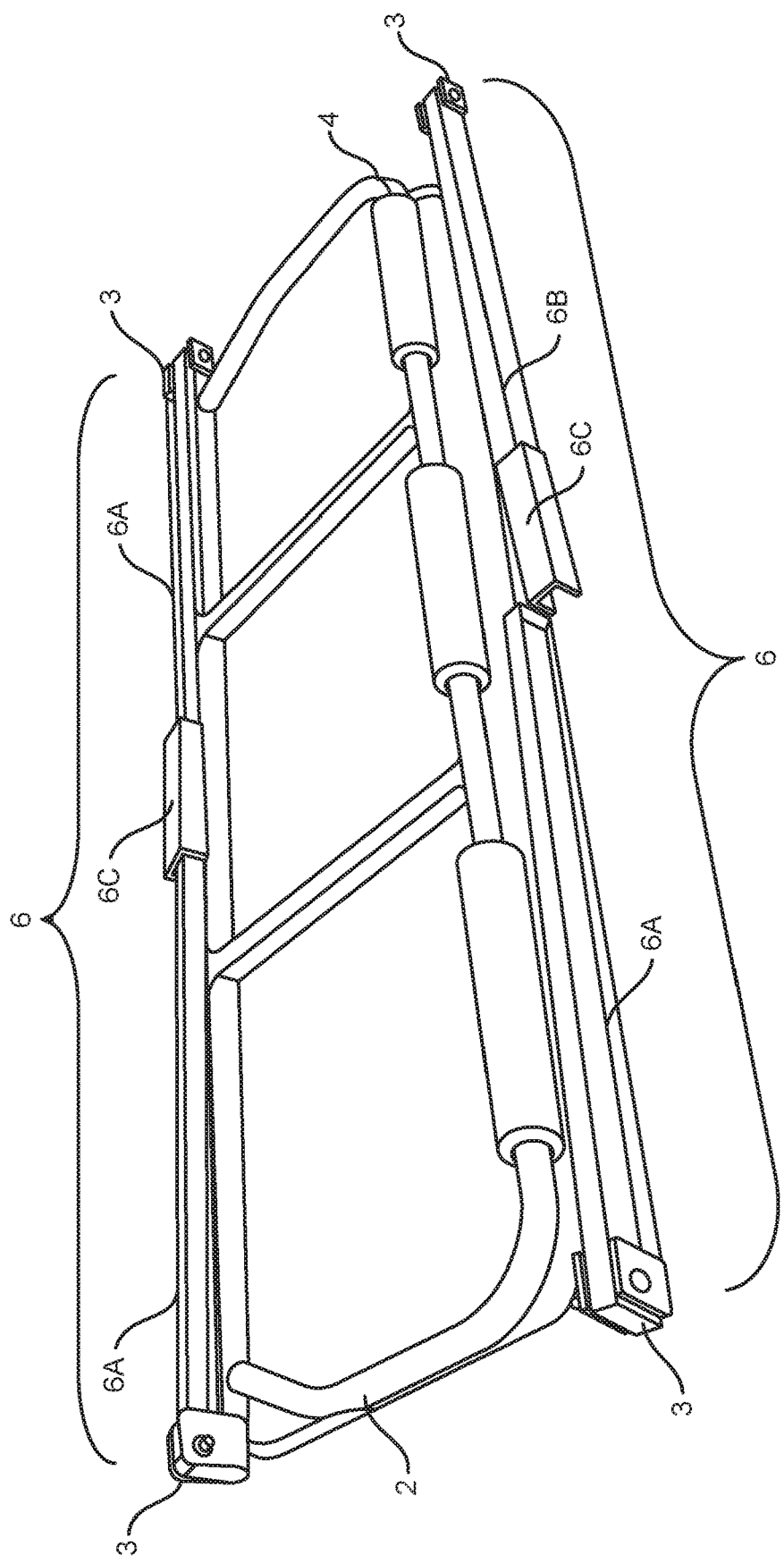
FIG. 3 is a perspective view collapsible frame of the semi-rigid rooftop cargo carrier according to the present invention in a closed or folded position.
Figure 4:
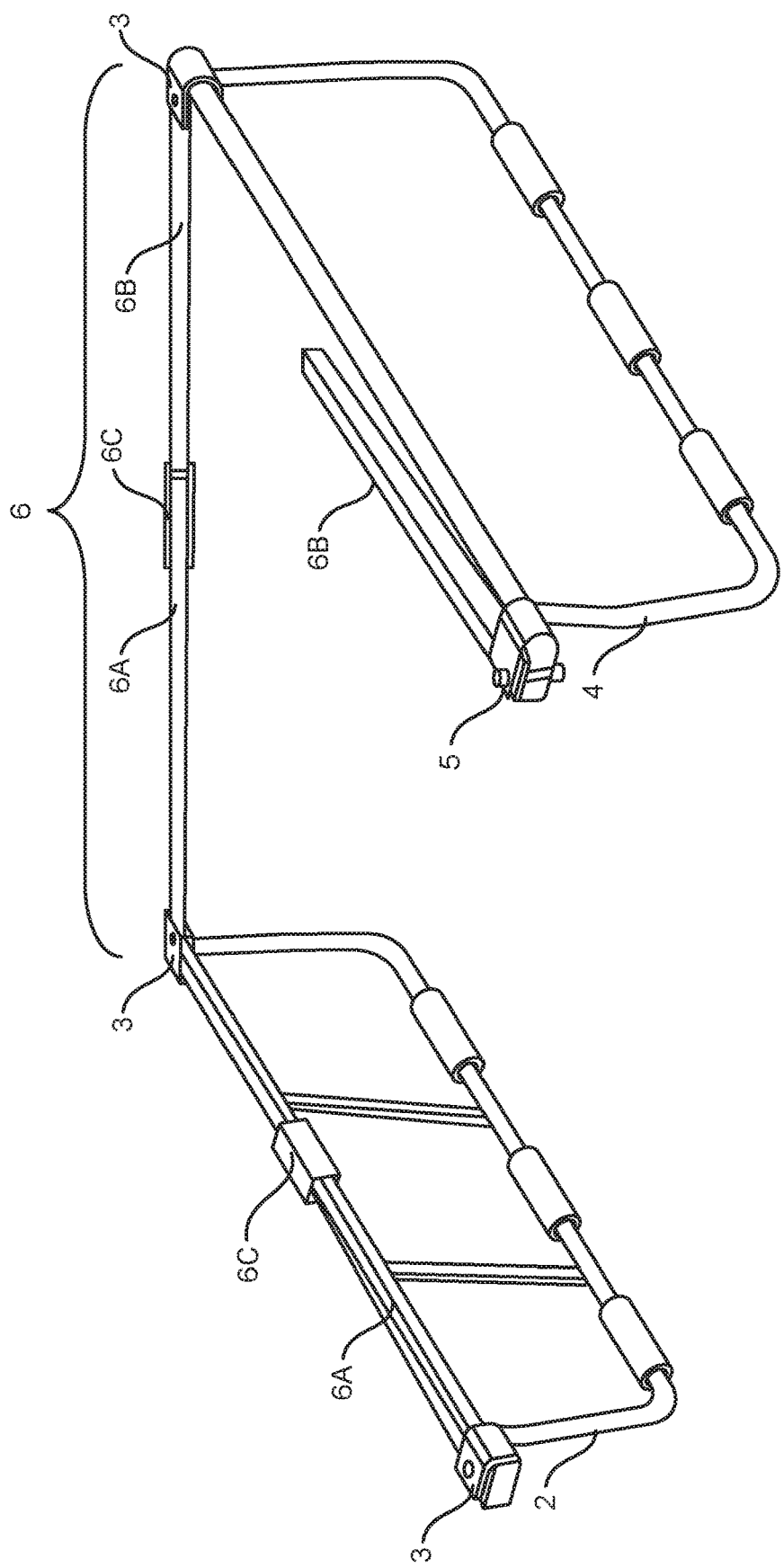
FIG. 4 is a perspective view showing the EPB on the far side engaged in an extended position and the EPB on the near side disengaged and side barsin a folded position.

Now referring to FIGS. 2-4, collapsible frame 20 includes front end member 2 and rear end member 4 comprising two opposing upper and lower bars and opposing side bars affixed thereto at a substantially perpendicular or slightly obtuse angle such that the lower ends extend about one half inch (1.35 cm) beyond respective ends of the upper bars of front end member 2 and rear end member 4 detachably secured to two opposing elongate side members 6 that are detachably secured by front and rear pivot fasteners 5 pivotally connecting respective ends of elongate side members 6 for inward folding to nest by upper bars of corresponding front end member 2 and rear end member 4 to collapse down into a flat position as illustrated in FIG. 3. A particularly preferred embodiment of the present invention shown in FIG. 6 utilizes a spring lock 7 to secure the fastener when opened to a position that is substantially perpendicular along a longitudinal axis to the upper surface of the front and end members, which are preferably rectangular frame cross panels. It is understood that the fasteners are not limited by this description and that any fastener or connection means may be utilized to connect the extendible side push bars and front and rear rectangular frame cross panels.

Figure 5:
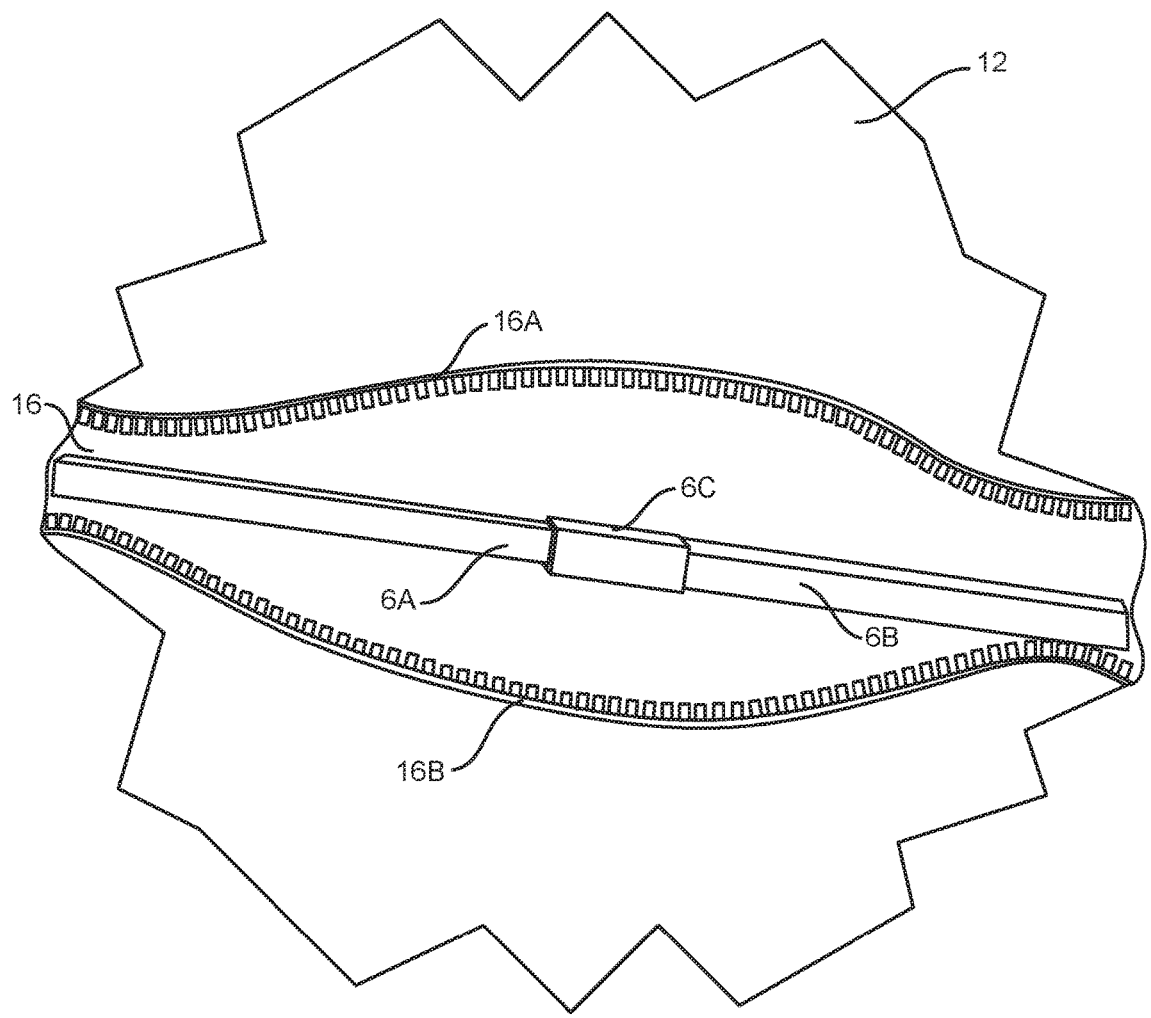
FIG. 5 is a cutaway perspective view showing the first and second side bars through a zippered opening wherethrough the EPB of the semi-rigid cargo carrier of the present invention is accessed to to engage and disengage the side bars in respective extended and folded positions.

A particularly preferred embodiment of the present invention shown in FIGS. 5 and 6 further includes opposing elongate side members 6 employing of EPBs accessed through zippered closeable side opening 16 including zipper edge members 16A and 16b configured to extend in a longitudinal direction along shell 12 such that it coextends along elongate side member 6A when zippered on collapsible frame 20 when in an open, assembled position. To assemble the semi-rigid rooftop cargo carrier, a user reaches through closeable side opening 16, to grasp a first side arm member 6A and side arm member 6B and inserts an end of first side arm member 6A into a corresponding end of side arm member 6B and thereby engages a corresponding side arm member 6B to secure the EPB securing mechanism 6C such that elongate side member is extendably aligned and the force applied tensionably mounts the pliable shell 12 about collapsible frame 20 in a fitted assembled open position as illustrated in FIG. 1. When first side arm member 6A and second side arm member 6B are secured by EPB securing mechanism 6C into an abutted longitudinal alignment, the extension of elongate side member 6 exerts thrust against the corresponding upper corners of front end member 2 and rear end member 4 to thereby simultaneously set collapsible frame 20 upright and tensionably mount pliable shell 12 on collapsible frame 20 such that angled edges and corners are aligned and taut to facilitate ready assembly of the semi-rigid rooftop cargo carrier 10 to adapt a shape in conformance with collapsible frame 20.

As illustrated in FIGS. 1 and 5, pliable shell 12 yet further includes zippered side openings 16 disposed along the longitudinal top seam of pliable shell 12 adjacent to elongate side members 6 wherethrough a user can access elongate side member 6 components and thereby insert side arm member 6A into EPB securing mechanism 6C on an end of corresponding side arm member 6B to then straighten and extend them into secured abutted linear alignment. The outward force exerted when extending elongate side member 6 into open position engages pivotable corner fasteners 3 and thereby locks opposing elongate side members 6 and opposing upper corners of front end member 2 and rear end member 4 into open, assembled position. Thus extending elongate side members 6 to set frame 10 into an open, upright position simultaneously exerts pressure on pliable shell 12 in a direction to mount pliable shell 12 about frame 20 without requiring tools and minimal shifting of pliable shell 12 in order to couple it onto corresponding portions of collapsible frame 20

Closeable side openings 16 include perimeter zipper edge members 16A and 16B along which corresponding flexible strips of a zipper of other equivalent fastener mechanism are affixed so as interlocking projections extend along an inner surfaces of perimeter edges 16A and 16B extending from outer perimeter of closeable side opening 16. In a particularly preferred embodiment of the present invention, the fastener mechanism is a water resistant zipper of which is corresponding strips are contiguously attached along a perimeter edge 16A and perimeter edge 16B so they can be continuously interlocked along closeable opening 16 to seal out rain and other elements when cargo carrier 10 is assembled. Alternative embodiments may employ equivalent closure mechanisms such as, for example, an interlocking groove and ridge.

The latter procedural steps are reversed for disassembly of cargo carrier 10. That is, closeable side opening 16 is unzipped and reached through to access elongate side arm members 6A and 6B and disengage EPB securing mechanism 6C. Then, first side arm member 6A and second side arm member 6B are disengaged, pivoted to fold inwardly to rest by corresponding end members 2 and 4 respectively. Pliable shell 10 is then neatly folded about the collapsed frame for compact storage.

In a particularly preferred embodiment illustrated in FIGS. 1 and 2, an additional feature of mounting at least one third elongate side member 8 in parallel alignment along a substantially longitudinal axis between the two elongate side members. Third elongate side member 8 may be further provided with an EPB securing mechanism 8A to facilitate expedited assembly and disassembly as well as compact storage. Third elongate side member 8 protects cargo carrier 10 and objects therein from potential damage from debris, snow and other objects or elements that descend and collide with cargo carrier 10.

Figure 7:
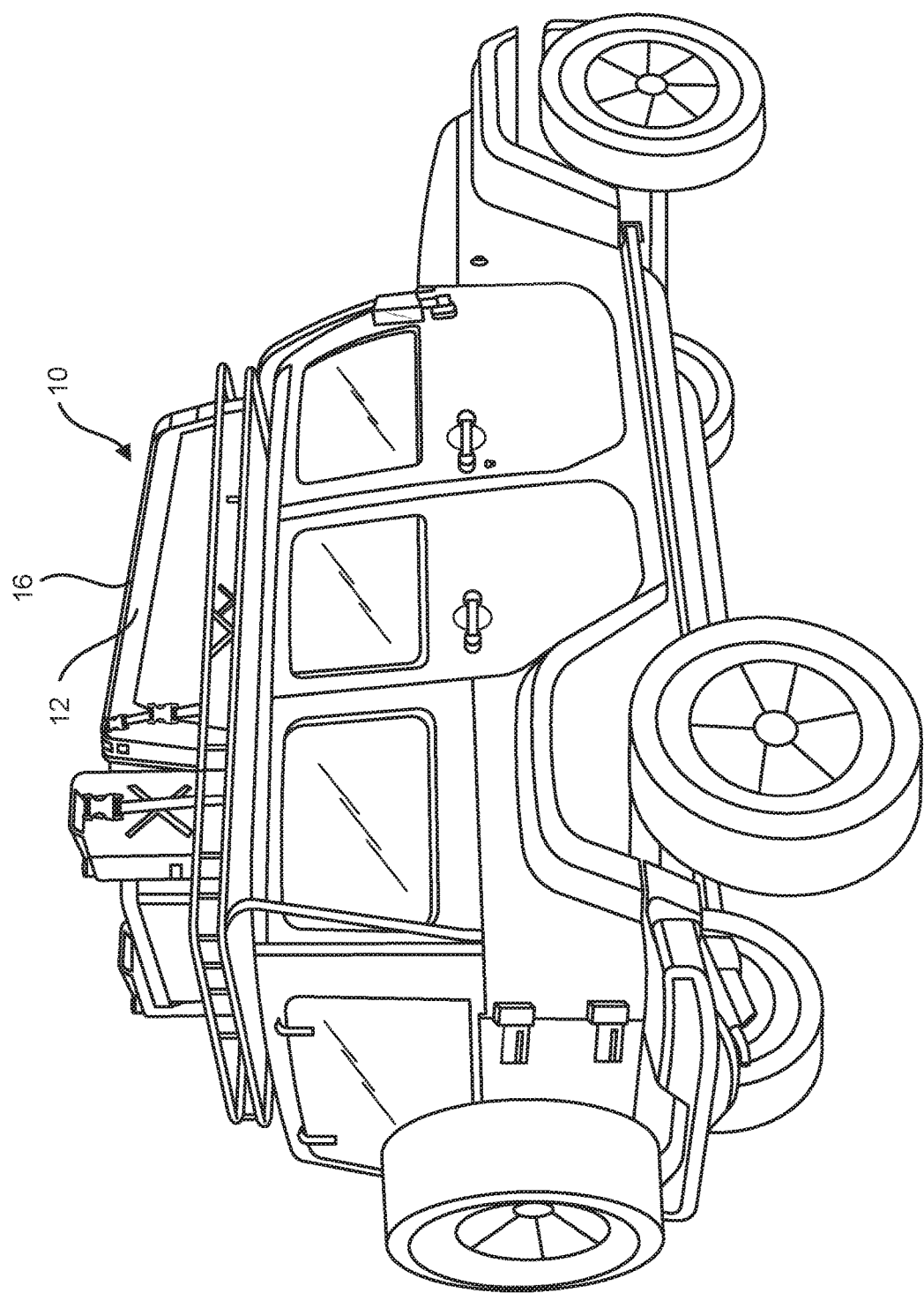
FIG. 7 is a perspective view of the assembled semi-rigid rooftop cargo carrier of the present invention installed on an vehicle rooftop.

Semi-rigid rooftop carrier 10 may be further provided with straps adaptable to various rooftop fixtures of a vehicle, as shown in FIG. 7. Alternative embodiments may employ various fasteners, including, for example, clamps and channel locks to secure the rooftop cargo carrier 10 to the relevant vehicle fixture.

The streamlined and self-contained construct of cargo carrier 10 provides numerous advantages over the prior art including facile and quick assembly and disassembly. Particular advantages are that no tools or loose components, such as, for example, fasteners screws, which can be misplaced and difficult to gather.

A yet further advantage is the lightweight and compact form when disassembled minimizing the cubic feet required to ship, move and store the structure. Even when extended in assembled position, the relatively lightweight and semi-rigid form of the cargo carrier according to the present invention render it readily grasped and inserted in a confined area.

In addition to being lightweight and durable, the facile construct of the present cargo carrier imparts unique mechanical and aerodynamic characteristics that make it aesthetically and mechanically compatible with a vehicle exterior imparting it with stability and aerodynamic characterics rendering it robust in windy conditions or under heavy weighting from snow loads. The semi-rigid composition of the pliable shell and frame matrix thus imparts pliability and strength providing the above and other advantages.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A semi-rigid cargo carrier comprising:
   a collapsible frame having
      at least two end members including an upper longitudinal bar and a lower longitudinal bar affixed to at least two opposing cross bars thereby forming a substantially planar frame wherein the upper longitudinal bar joins opposing ends of the at least two cross bars to form an opposing pair of upper corners,
      at least two elongate side members having opposing ends pivotally connected to each of the opposing pair of upper corners of the at least two end members, wherein the at least two elongate side members include a first side arm member and a second side arm member, wherein the first elongate side arm member and the second elongate side arm member has a pivot end pivotally attached proximal to the opposing pair of upper corners of each of the at least two end members and a fastenable end for fastening to an EPB securing mechanism, and wherein the EPB securing mechanism is capable of detachably fastening the fastenable end of the first side arm member and the fastenable end of the second side arm member of the at least two side members into abutted engagement so as to secure the at least two elongate side members in extended linear longitudinal alignment exerting outward pressure against the pair of opposing upper corners of the at least two end members to thereby pivot the at least two elongate side members to form the substantially rectangular plane with the longitudinal bars of the end members placing the semi-rigid carrier in the assembled position, and wherein the at least two elongate side members form a substantially rectangular plane with the upper longitudinal bars of the end members when the semi-rigid cargo carrier is in the assembled position; and
   a pliable shell sized and configured for tensionable mounting about the collapsible frame such that outward pressure exerted by the at least two opposing elongate side members pivots the at least two end members into an assembled position and thereby mounts the pliable shell into taut alignment whereby the opposing force exerted between the pliable shell and the collapsible frame sets the semi-rigid cargo carrier in an assembled position.

2. The semi-rigid cargo carrier of claim 1, wherein the EPB securing mechanism comprises a channel portion on the fastenable end of each of the first side arm members of the at least two elongate side members configured for receiving the fastenable end of the second side arm member of each of the at least two elongate side members into abutted engagement such that the at least two elongate side members are secured into linear alignment whereby the pivot end of the first side arm member and the pivot end of the second side arm member of the at least two elongate side members exert outward force against the opposing pair of upper corners of the at least two end members to thereby pivot the at least two elongate side members to form the substantially rectangular plane with the longitudinal bars of the end members placing the semi-rigid carrier in the assembled position.

3. The semi-rigid cargo carrier of claim 2, wherein the at least two elongate side members are oriented at a substantially perpendicular angle with the end members to form a substantially rectangular configuration with the upper longitudinal bars of the end members when the semi-rigid cargo carrier is in the assembled position and further comprising corner fasteners whereon the pivot ends of the at least two side members are attachable.

4. The semi-rigid cargo carrier of claim 3, further comprising closeable side openings wherethrough the EPB securing mechanism is accessed to thereby detachably fasten the fastenable end of the first side arm member and the fastenable end of the second side arm member into abutted engagement so as to secure the at least two elongate side members in extended linear alignment and thereby engage the corner fasteners so as to place the collapsible frame in the assembled position.

5. The semi-rigid cargo carrier of claim 4, wherein the closeable side openings are provided with a zipper.

6. The semi-rigid cargo carrier of claim 5, further comprising a third side member having a pivot end detachably mountable to an upper longitudinal bar between the at least two side members and a fastenable end detachably mountable to the upper longitudinal bar of one of the end members, wherein the fastenable end is positioned between the at least two side members when the semi-rigid cargo carrier is in the assembled position.

7. The semi-rigid cargo carrier of claim 6, wherein the third side member further comprises an EPB securing mechanism for securing the support bar in an extended aligned position when the semi-rigid cargo carrier is in assembled position.

8. The semi-rigid cargo carrier of claim 4, wherein the pliable shell is a nylon fabric covered with a plastic coating.

9. A semi-rigid cargo carrier comprising:
a collapsible frame having
at least two end members including an upper longitudinal bar and a lower longitudinal bar connected by at least two opposing cross bars thereby forming a substantially planar frame wherein the upper longitudinal bar joins the at least two opposing cross bars to form an opposing pair of upper corners having pivot members proximal to each of the opposing pair of upper corners connected in perpendicular orientation to at least two opposing elongate side members comprising a first side arm member and a second side arm member, wherein the first side arm member and the second side arm member has a fastenable end for abutted engagement in an EPB securing mechanism to lock the at least two elongate side members into extended linear longitudinal alignment
at least two opposing elongate side members each of which include a first side arm member having a pivot end and a fastenable end and a second side arm member having a pivot end and a fastenable end, wherein the pivot ends of the at least two elongate side members are pivotally connected to corresponding upper corners of the two end members;
an EPB securing mechanism on a fastenable end of the first side arm member of each of the at least two elongate side members, wherein the EPB is capable of detachably fastening the fastenable end of the first side arm member and the fastenable end of the second side arm member of each of the at least two opposing elongate members in secured abutted engagement such that the at least two elongate side members are extended into linear longitudinal alignment;
a pliable shell sized and configured for tensionable mounting about the collapsible frame such that outward pressure exerted by the at least two elongate side members engages with corresponding upper corners of the at least two end members pivots the at least two end members into an assembled position and thereby mounts the pliable shell into taut alignment whereby the opposing force exerted between the pliable shell and the collapsible frame sets the semi-rigid cargo carrier in an assembled position;
at least two closeable side openings oriented in the pliable shell for accessing the first side arm member and second side arm member to thereby engage the EPB securing mechanism so as to position corresponding fastenable ends of the second side arm members of each of the elongate side members in abutted alignment whereby outward pressure exerted by the at least two elongate side members on each of the pivot ends of the at least two elongate side members pivot the end members to thereby push the collapsible frame in the assembled position.

10. The semi-rigid cargo carrier of claim 9, further comprising a spring button proximal to the fastenable end of the second side arm member and wherein the EPB securing mechanism comprises a channel portion on the fastenable end of each of the first side arm members of the at least two elongate side members configured for receiving the corresponding fastenable end of the second side arm member such that engaging the spring button within the channel portion of the EPB securing mechanism secures the at least two elongate side members in abutted engagement member thereby pivoting the corner fasteners into substantially perpendicular alignment with the end members so as to position the collapsible frame in the assembled position.

11. The semi-rigid cargo carrier of claim 9, further comprising a third elongate side member detachably mountable between the at least two elongate side members on the longitudinal bars of the end members when the semi-rigid cargo carrier is in the assembled position.

12. The semi-rigid cargo carrier of claim 9, wherein the third elongate side member further comprises:
a first side arm member and a second side arm member; and
an EPB securing mechanism capable of securing the third elongate side member in an extended aligned position.

13. The semi-rigid cargo carrier of claim 9, wherein the pliable shell is a waterproof fabric covered with a nylon coating.

14. A method for assembling a semi-rigid cargo carrier of claim 1, comprising the steps of:
providing a at least two end members including a pivot end member and a fastenable end member with an upper longitudinal bar and a lower longitudinal bar affixed to at least two opposing cross bars forming upper corners and lower corners along a substantially planar orientation;
providing a pliable shell sized and configured for mounted tensionable seating about the collapsible frame, wherein the pliable shell has at least two closeable side openings for accessing the first and second side arm members of the at least two elongate side members;

providing at least two opposing elongate side members comprising a first side arm member having a pivot end and a fastenable end and a second side arm member having a pivot end and a fastenable end for detachable abutted attachment by an EPB securing mechanism, wherein the pivot ends of the at least two elongate side members are pivotally fastened to corresponding upper corners of the at least two end members;

providing an EPB securing mechanism comprising a channel portion affixed to the fastenable end of the first side arm member of each of the elongate side members configured for receiving the corresponding fastenable ends of the second side arm member of each of the elongate side members;

providing a spring button proximal to a fastenable end of each of the second side arm members for engaging corresponding fastenable ends of the first side arm members and fastenable ends of the second side arm member into abutted extended alignment;

opening the closeable side opening;

depressing the spring button proximal to the fastenable end of the second side arm members of each of the elongate side members to clear passage of corresponding fastenable ends of the first side arm member for receiving the corresponding fastenable ends of the second side arm member;

inserting the fastenable end of each of the second side arm members of each of the elongate side members into corresponding channel portions of each of the EPB securing mechanisms affixed to the fastenable ends of the first side arm member of each of the elongate side members; and engaging corresponding fastenable ends of each of the first side arm members of each of the elongate side members to secure the spring button within corresponding channel portions of each of the EPB securing mechanisms so as to secure each of the elongate side members into extended, aligned position, thereby pushing the corner fasteners so as to set the the collapsible frame upright and thereby mount the pliable shell thereon such that the semi-rigid cargo carrier is placed in the assembled position;

fastening the semi-rigid cargo carrier to a rooftop fixture on a vehicle; opening the closeable side opening;

releasing the EPB securing mechanism to thereby disengage the first side arm members and the second side arm members of the at least two elongate side members; and pivoting the first and second side arm members inwardly toward the corresponding side arm members and thereby collapsing the semi-rigid cargo carrier into a disassembled position; and closing the closeable side opening.

15. The method for assembling a semi-rigid cargo carrier of claim 14, wherein the step of opening of the closeable side openings comprises unzipping to thereby open a zipper and the step of closing the closeable side openings comprises unzipping a zipper.

* * * * *